(12) United States Patent
Razzell et al.

(10) Patent No.: US 8,009,724 B2
(45) Date of Patent: Aug. 30, 2011

(54) CLEAR CHANNEL ASSESSMENT (CCA) FOR UWB COMMUNICATIONS SYSTEM

(75) Inventors: Charles Razzell, Pleasanton, CA (US); Yifeng Zhang, San Jose, CA (US)

(73) Assignee: NXP B.V., Eindhoven (NL)

( * ) Notice: Subject to any disclaimer, the term of this patent is extended or adjusted under 35 U.S.C. 154(b) by 979 days.

(21) Appl. No.: 11/574,235

(22) PCT Filed: Aug. 25, 2005

(86) PCT No.: PCT/IB2005/052796
§ 371 (c)(1),
(2), (4) Date: Oct. 24, 2007

(87) PCT Pub. No.: WO2006/021937
PCT Pub. Date: Mar. 2, 2006

(65) Prior Publication Data
US 2008/0192810 A1  Aug. 14, 2008

Related U.S. Application Data

(60) Provisional application No. 60/639,915, filed on Dec. 28, 2004, provisional application No. 60/604,789, filed on Aug. 25, 2004.

(51) Int. Cl.
*H04B 1/00* (2006.01)
(52) U.S. Cl. ........ 375/150; 375/142; 375/143; 375/152; 375/316; 375/340; 375/343; 375/368; 370/509; 370/510

(58) Field of Classification Search ............ 375/142, 375/143, 150, 152, 316, 340, 343, 368; 370/509, 370/510
See application file for complete search history.

(56) References Cited

U.S. PATENT DOCUMENTS

| 7,457,295 | B2 * | 11/2008 | Saunders et al. | 370/395.21 |
| 7,634,034 | B2 * | 12/2009 | Larsson | 375/362 |
| 2004/0120424 | A1 | 6/2004 | Roberts | |

FOREIGN PATENT DOCUMENTS
WO    2004054280 A2    6/2004

OTHER PUBLICATIONS

Brendan C. Jones, David J. Skellern, Hiperlan System Performance Under DCA and FCA, 8th IEEE International Symposium on Personal, Indoor and Mobile Radio Communications, Sep. 1-4, 1997, p. 1-5, Helsinki, Finland.

* cited by examiner

*Primary Examiner* — Leon Flores

(57) ABSTRACT

Clear channel assessment (CCA) is a very important issue in Ultra-Wideband (UWB) systems. An effective CCA mechanism will have a large impact on the overall throughput of the communications system. It is disclosed methods and circuits to carry out CCA determinations exploiting the structure of the pulse signal either by using a moving average or by performing a cross-correlation with a locally generated signal.

6 Claims, 8 Drawing Sheets

CLEAR CHANNEL ASSESSMENT (CCA) FOR UWB COMMUNICATIONS SYSTEM

It is already well known to provide Clear Channel Assessment for communications systems such as wireless LANs, where access mechanisms such as Carrier Sense Multiple Access/Collision Detect are used to control access to the wireless medium. These methods are typically based on Energy Detect methods (such as Received Signal Strength Indicators with a suitable threshold level). Other methods are known such as to look for specific code words by cross-correlation (for example the Barker-11 codeword used in 802.11b).

In the case of Energy Detection schemes, these are not well suited to Ultra-Wideband systems, which are designed to emit energy at levels below what is permitted for incidental radiators such as personal computers and hair-dryers. The fact that low-level energy is present is not a good indication of the presence of a deliberate Ultra-Wideband signal. Something more discriminating is required.

In the case of Multi-Band OFDM (MB-OFDM), the UWB signal of interest will employ OFDM, which codes information in the frequency domain; therefore there is no regular time-domain feature in the payload part of the transmission that can be exploited to determine the presence of the signal by code-word correlations. The only part of the burst that can be used in this way is the preamble, but this occurs rather infrequently (at the start of each burst) and is not compatible with the requirement to make a CCA assessment within a short period of time.

What is needed, and what this invention provides, is a mechanism to detect the presence of the main payload part of the UWB signal without the need to first synchronize with the signal, demodulate the signal and decode the signal contents.

This invention makes use of the structure of the envelope of the MB-OFDM signal for Clear Channel Assessment.

The general approach of the proposed method is to correlate the envelope of the received signal with either a rectangular wave or a sine wave of a frequency equal to the symbol rate of the OFDM transmission system. In the case of a rectangular reference signal, this can be equivalently stated as a moving average of the signal envelope over the length of the OFDM symbol (128 samples).

The present invention may be further understood from the following description in conjunction with the appended drawing. In the drawing.

Figure 9:
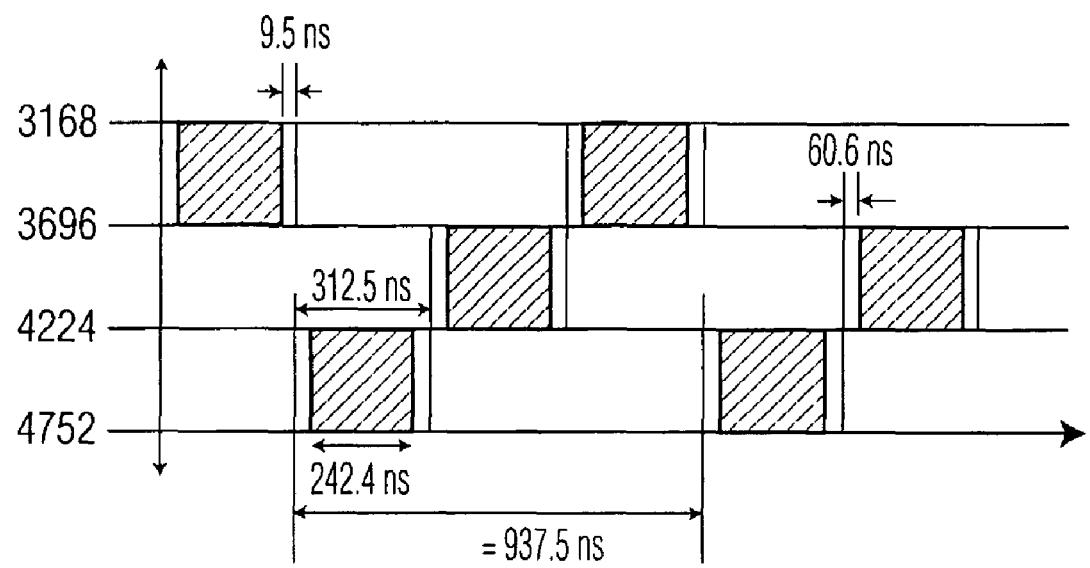
FIG. 9 is a diagram illustrating the structure of a UWB signal.

An illustration of the structure of the envelope of the MB-OFDM signal is shown in FIG. 9. As shown, each OFDM symbol is preceded by a 60.6 ns zero-prefix portion and followed by a 9.5 ns guard interval. Only 242 ns out of the possible 315.5 ns contains signal energy.

In addition to this, a hopping pattern is introduced to further spread the spectral energy over adjacent 528 MHz bands. Different hopping patterns apply to different piconets in an effort to minimize unwanted interactions between them.

However, the important feature for this disclosure is the amplitude weighting function of the stream of OFDM symbols, which is given by equation 1, below.

$$w(t) = \begin{cases} 0 & 0 \leq t < T_{zp} \\ 1 & T_{zp} \leq t < T - T_{GI} \\ 0 & T - T_{GI} \leq t < T \end{cases} \quad (1)$$

Here, $T_{zp}$ is the duration of zero padding and $T_{GI}$ is the duration of the guard interval. Assuming a Nyquist sampling rate (528 Msps), each UWB symbol is 165 samples, and each OFDM symbol is 128 samples.

For the purposes of describing the algorithms proposed, the following notation has been developed.

The $n^{th}$ symbol of a UWB signal can be represented as $$s(t) = d(t)w(t)e^{j2\pi f_{nc}t}, \quad (n-1)T \leq t < nT \quad (1)$$

where, T is the duration of one UWB symbol in a frame. $f_{nc}$ is the RF carrier frequency for the $n^{th}$ symbol. In the UWB system, the carrier frequency changes symbol by symbol. A TFI code determines the RF carrier frequency for a particular symbol. d(t) is an OFDM signal, $$d(t) = \sum_{m=-N/2}^{N/2-1} c_{n,m} e^{j2\pi mft} \quad (n-1)T \leq t < nT \quad (2)$$

$c_{n,m} \in C^M$ is the complex symbol on the $m^{th}$ sub-carrier of $n^{th}$ symbol, $C^M$ is the set of M-ary complex symbol for data transmission. In the UWB system, M=4. N is the total number of sub-carriers and N=128; f equals to 4.125 MHz is the sub-carrier spacing. w(t) is a window function introduced by the Zero Padding (ZP) and Guard Interval (GI).

$$w(t) = \begin{cases} 0 & 0 \leq t < T_{zp} \\ 1 & T_{zp} \leq t < T - T_{GI} \\ 0 & T - T_{GI} \leq t < t \end{cases} \quad (3)$$

Here, $T_{zp}$ is the duration of zero padding and $T_{GI}$ is the duration of the guard interval. To ease explanation, in the following description, the notation UWB is used to refer to s(t) and the notation OFDM is used to refer to non-zero portion of s(t); also, unless otherwise mentioned, the Nyquist rate (528 Msps) is used for the data processing assuring that the down-sampling is done properly. Hence, each UWB symbol has 165 samples, and each OFDM symbol has 128 samples.

Figure 1:
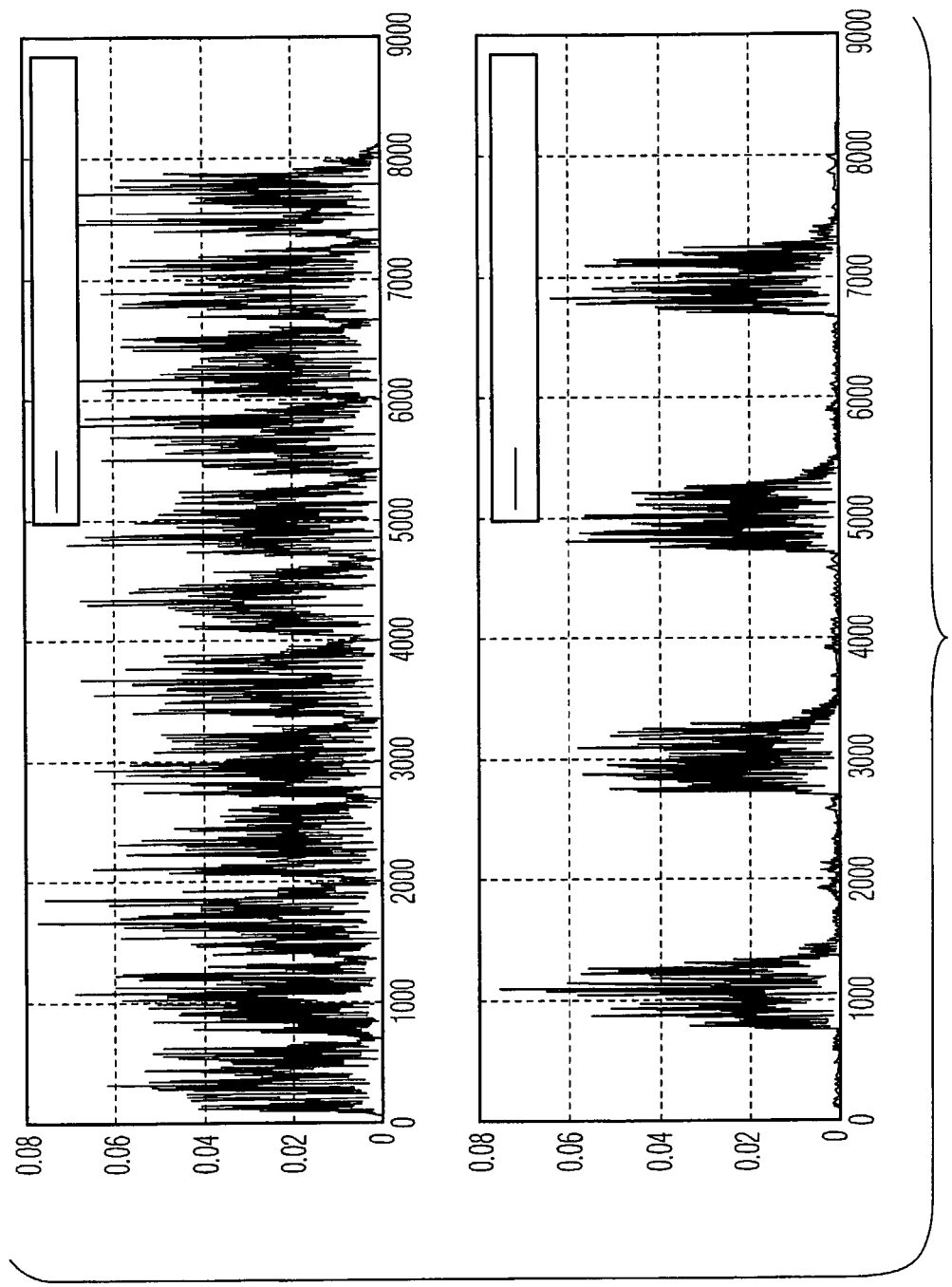
FIG. 1 is a signal diagram showing a UWB signal received with a fixed local oscillator frequency.

Since the proposed UWB signal uses an inter symbol frequency hopping scheme, time synchronization is critical for properly detecting the signal. If the local oscillator (LO) frequency for down-conversion is switched at the improper moment, the wanted signal will be converted to a center frequency at 528 (or 1056) MHz. The channel filter will then reject the wanted signal, and the received signal will be noise only. Upon consideration, this suggests a CCA scheme for systems without information of hopping synchronization (especially where the receiver may miss the synchronization symbol). If the receiver uses only a fixed LO frequency for down-conversion, say channel 2 (3960 MHz), the received signal can be viewed as the product of an OFDM signal and a window function with a duty cycle of 128/(165*3). FIG. 1 shows an example of a received UWB signal with a fixed LO frequency. The upper plot is the one at the antenna input where different symbols are modulated on different carrier frequencies. And the lower plot is the output signal after down-conversion with LO and channel filtering. It is shown that symbols that are not down-converted to around DC are rejected by the channel filter. Note that the present description focuses on the mode where channel hopping is always performed. For fixed frequency modes, a different algorithm is required.

Since an OFDM signal can be looked as a WGN signal in the time domain (when N>>1), the received signal can be viewed as:

$$r(t) = \begin{cases} n(t) & t_0 \leq t < t_0 + T_d \\ n_s(t) + n(t) & T_d + t_0 \leq t < t_0 + T_d + T - T_{ZP} - T_{GI} \\ n(t) & T_d + T - T_{ZP} - T_{GI} + t_0 \leq t < t_0 + 3T \end{cases} \quad (5)$$

Here, $t_0$ is a random starting time moment for the receiver, $T_d$ is the time difference between the start of receiving to the starting moment when a valid OFDM symbol is down-converted to around DC, n(t) is WGN and $n_s(t)$ is $$n_s(t) = \sum_{m=-N/2}^{N/2-1} c_{n,m} h_{n,m} e^{j2\pi m f t} \quad (n-1)T \leq t < nT \quad (6)$$

$h_{n,m}$ is the complex channel response on the $m^{th}$ sub-carrier of $n^{th}$ symbol. According to Parseval's theorem for a periodic signal:

$$\frac{1}{T} \int_{(n-1)T}^{nT} n_s(t) n_s^*(t) \, dt = \sum_{m=N/2}^{N/2-1} |c_{n,m} h_{n,m}|^2 \quad (7)$$

Figure 2:
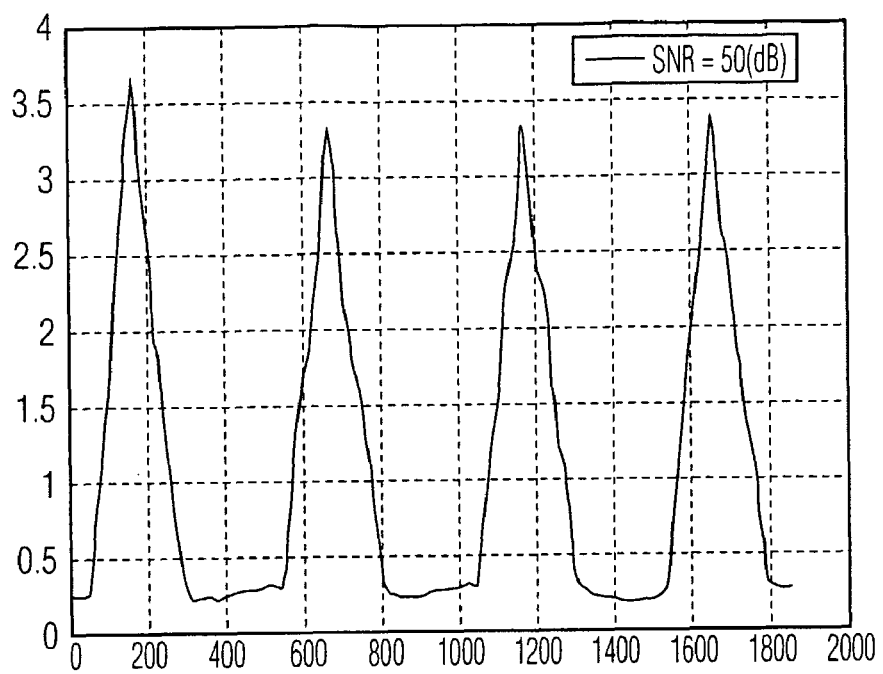
FIG. 2 is a signal diagram showing the moving average of normalized received power in a 10 dB SNR system.
Figure 3:
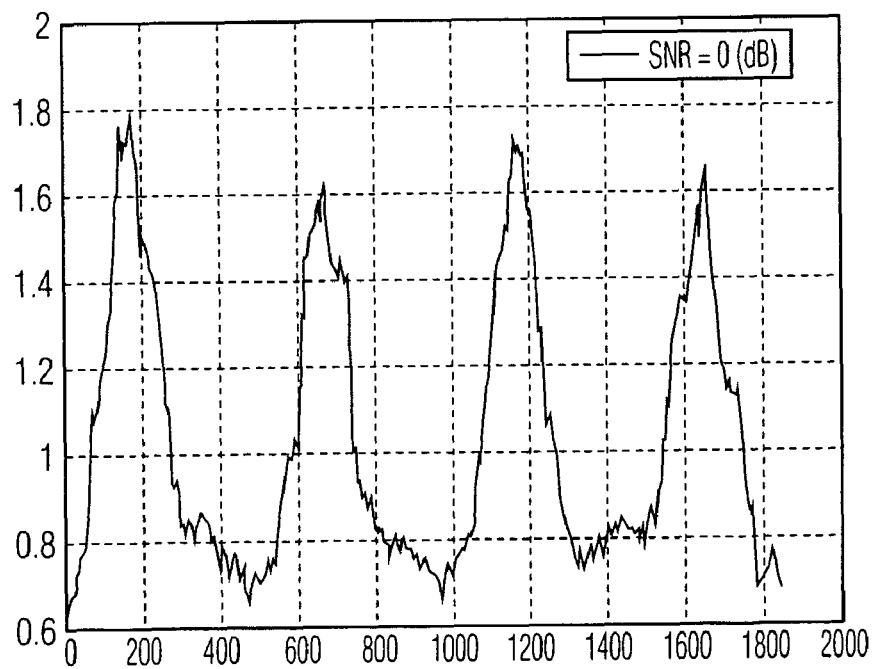
FIG. 3 is a signal diagram showing the moving average of normalized received power in a 0 dB SNR system.
Figure 4:
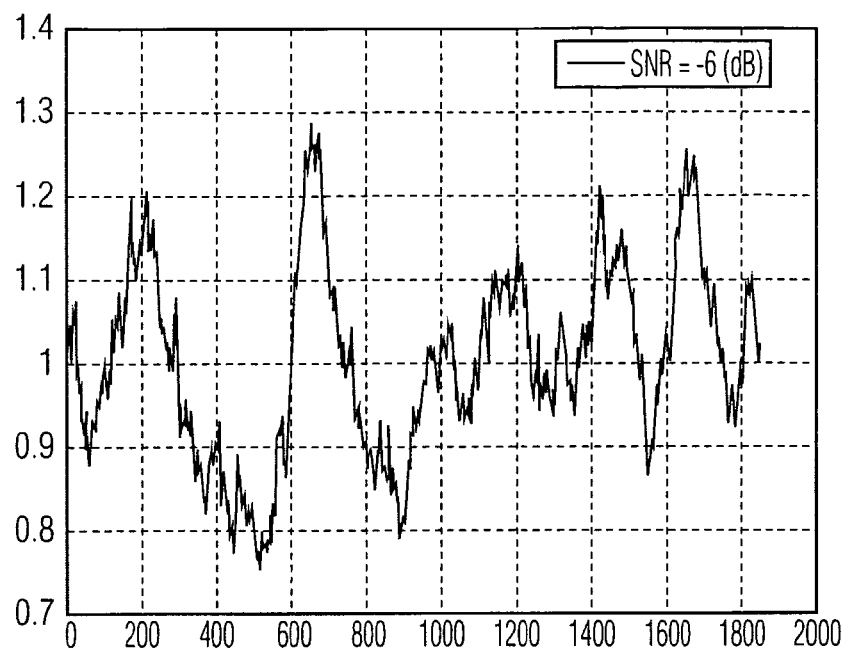
FIG. 4 is a signal diagram showing the moving average of normalized received power in a −6 dB SNR system.

The left hand side of equation (7) is the moving average (MA) of the power of the time domain signal over one period (128 samples), and the right hand side is the maximal ratio combining (MRC) of frequency domain signal. Since MRC has the maximal SNR, the moving average of power over one period is then equivalent to a MRC detection of the existence of an OFDM symbol. A pre-determined threshold can be used to compare with the MA output to derive a CCA decision. FIG. 2, FIG. 3 and FIG. 4 show the MA output with different SNRs in a fading channel. The MA output here is normalized over the mean power of the received sequence. The x-axis is in number of samples and the y-axis is the normalized MA output. The peak appears when the maximal SNR is achieved.

The periodicity is due to the fact that receiver LO stays at a fixed frequency and the input follows a signal hopping pattern at three different LO frequencies. Therefore, the peak occurs every three symbols (495 samples here).

Based on the results in the analysis and figures, the following CCA algorithm is proposed for a system without synchronization information of frequency hopping.

1. Fix the LO frequency to a pre-determined channel frequency.
2. Set a peak counter to 0.
3. Calculate the mean power (Pmean) of 495 samples (3 consecutive symbols)
4. Calculate the normalized (normalized to Pmean) moving average power of 128 samples.
5. Compare the MA output (MAO) with a predetermined threshold (Pth), start peak searching, and find the local peak. When the MA output drops below the threshold (MA<Pth), freeze the local peak value, record the peak position, and increase the peak counter by 1.
6. Start searching for the next peak in the same manner as the first one until its value is frozen. If the peak position difference of adjacent peaks is less than a predetermined value, discard the latest peak and don't increment the peak counter; otherwise, increment the peak counter.
7. Repeat step 6 until the end of a CCA timer. If more than one peak is found, CCA is declared (channel busy).

The threshold Pth can be tuned to adjust the false alarm rate and detection ratio (or frame miss rate). Note from FIG. 2 that periodicity can also be used to control the false alarm and detection ratio. In step 6, a detection window is set to improve the false alarm performance. If the distance of two peaks is not larger than a window of size 495 (samples), then the "peak" is recognized instead as noise, and will not be counted as a valid peak. Properly setting Pth and window size can optimize the false alarm rate and detection ratio.

Figure 10:
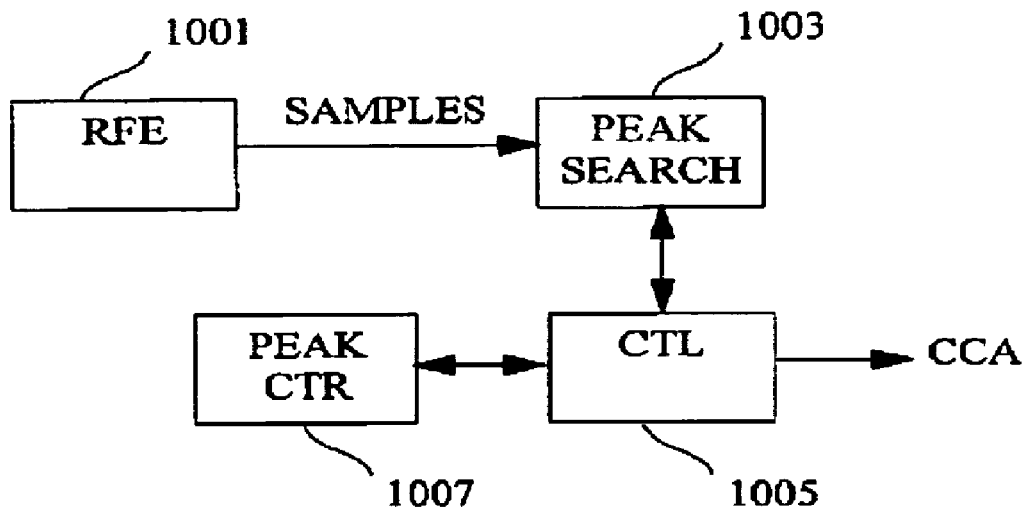
FIG. 10 is a block diagram illustrating a first Clear Channel Assessment circuit.

Referring to FIG. 10, a block diagram is shown of a circuit for performing Clear Channel Assessment according to the foregoing method. A Radio Front End (RFE) circuit 1001 produces signal samples that are applied to a peak search circuit 1003 controlled by a control circuit 1005. The control circuit 1005 operates according to the foregoing algorithm, using a peak counter 1007 to record the number of peaks found. Based on the number of peaks, the control circuit 1005 produces a Clear Channel Assessment signal CCA.

Figure 5:
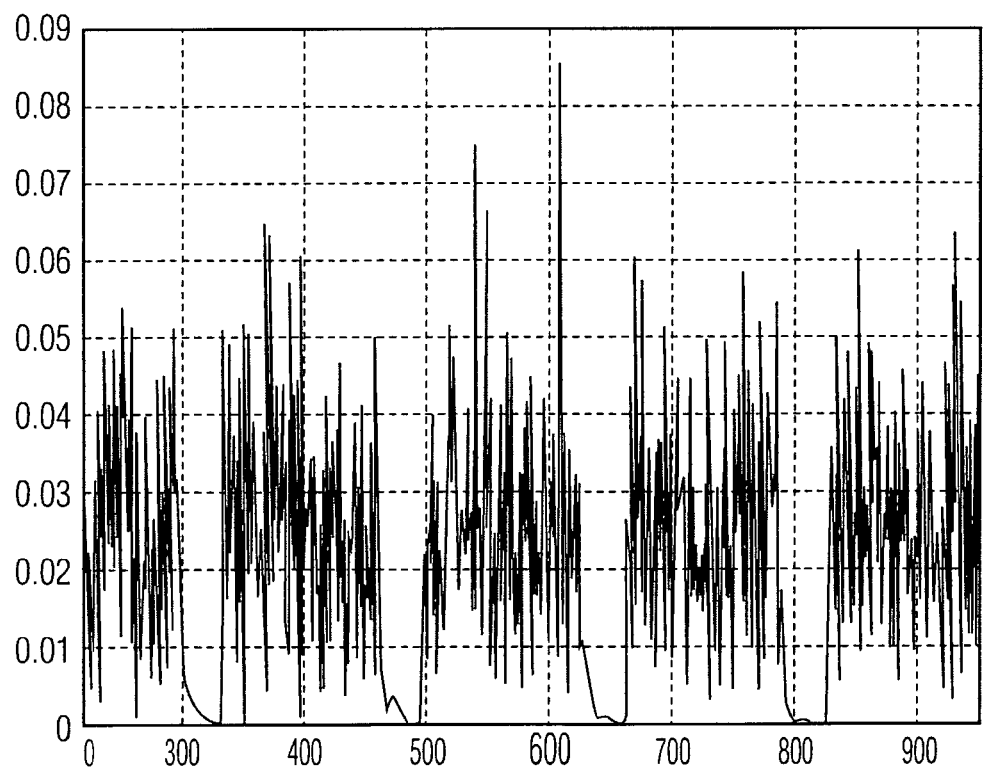
FIG. 5 is a signal diagram showing the magnitude of a received UWB signal after having been down-converted by a multi-tone receiver and filtered by a channel filter.

From equation (1) it can be seen that if the hopping synchronization information (the moment for channel switching) is coarsely available to the receiver, all the symbols can be properly down-converted to around DC, and the UWB symbols can be viewed as the product of OFDM signal and a 3.2 MHz square wave clock signal with duty cycle of 128/165. FIG. 5 shows the magnitude of a received UWB signal after having been down-converted by a multi-tone receiver and filtered by a channel filter. The periodic gating effect is explicit in the plot.

If an envelope detection is first performed, and a cross correlation with a 3.2 MHz sinusoid is then followed, the normalized correlation output can also be used as a metric for CCA decision. That is, let e(t) be the instantaneous power of the signal, $$e(t) = r(t) \cdot r(t)^* \quad (8)$$

By calculating the instantaneous power, the phase rotation introduced by frequency offset can be removed. Since e(t) has very strong DC component, it will reduce the sensitivity of other frequency components at the correlator output. The DC component is subtracted from the signal envelope, thus, enhancing the sensitivity of detecting the 3.2 MHz frequency component.

$$p(t) = e(t) - \int_{t_0}^{t_0+T} e(t)dt \qquad (9)$$

The correlator output is then calculated as:

$$\text{corr} = \frac{2\int_{t_0}^{t_0+T} p(t)\cos(2\pi f_0 t)\,dt}{\int_{t_0}^{t_0+T}|p(t)|^2\,dt} \qquad (10)$$

Figure 6:
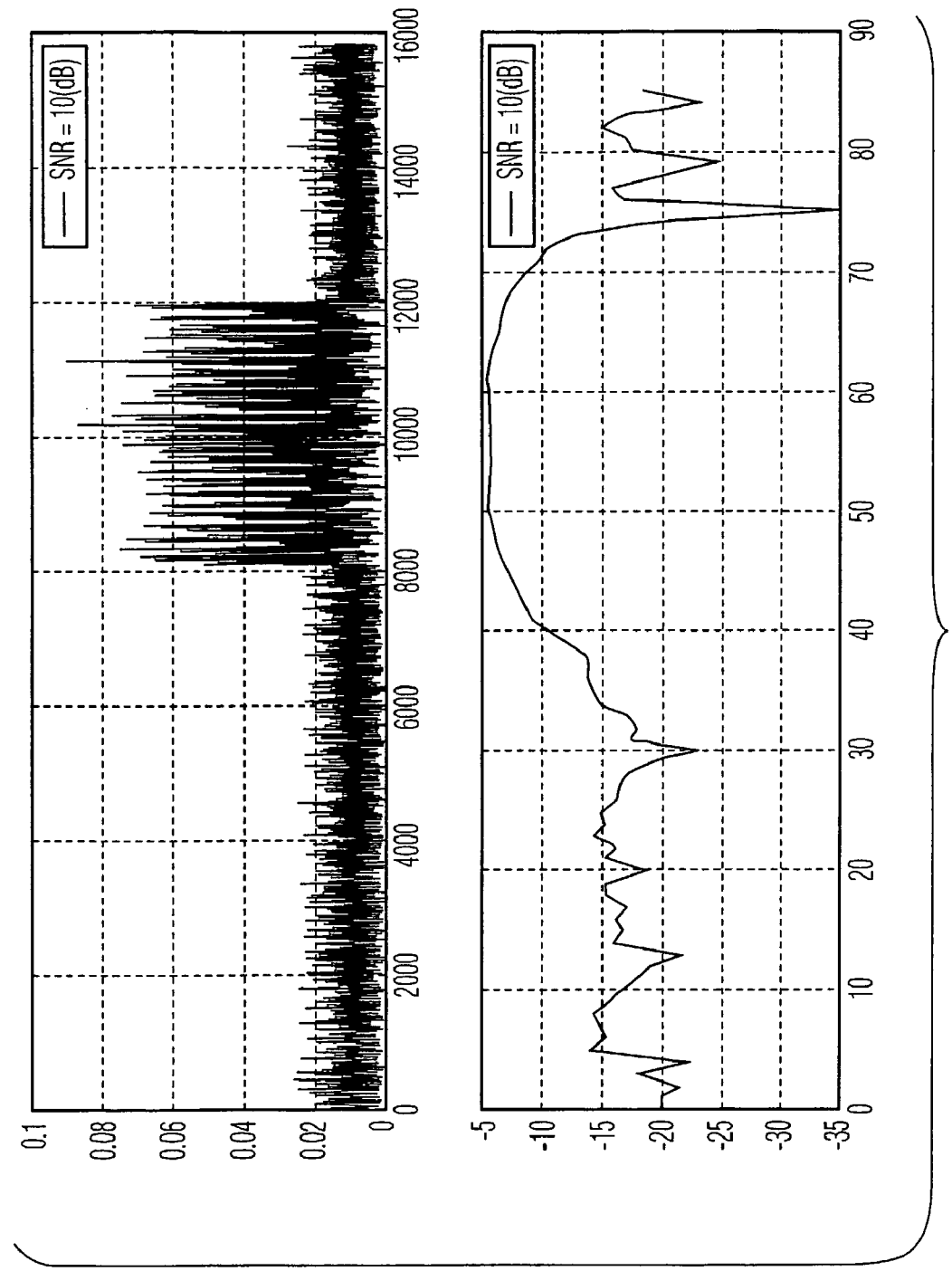
FIG. 6 is a signal diagram showing a received UWB signal and its cross-correlation with a locally-generated signal (e.g., a sinusoid) in a 10 dB SNR system.
Figure 7:
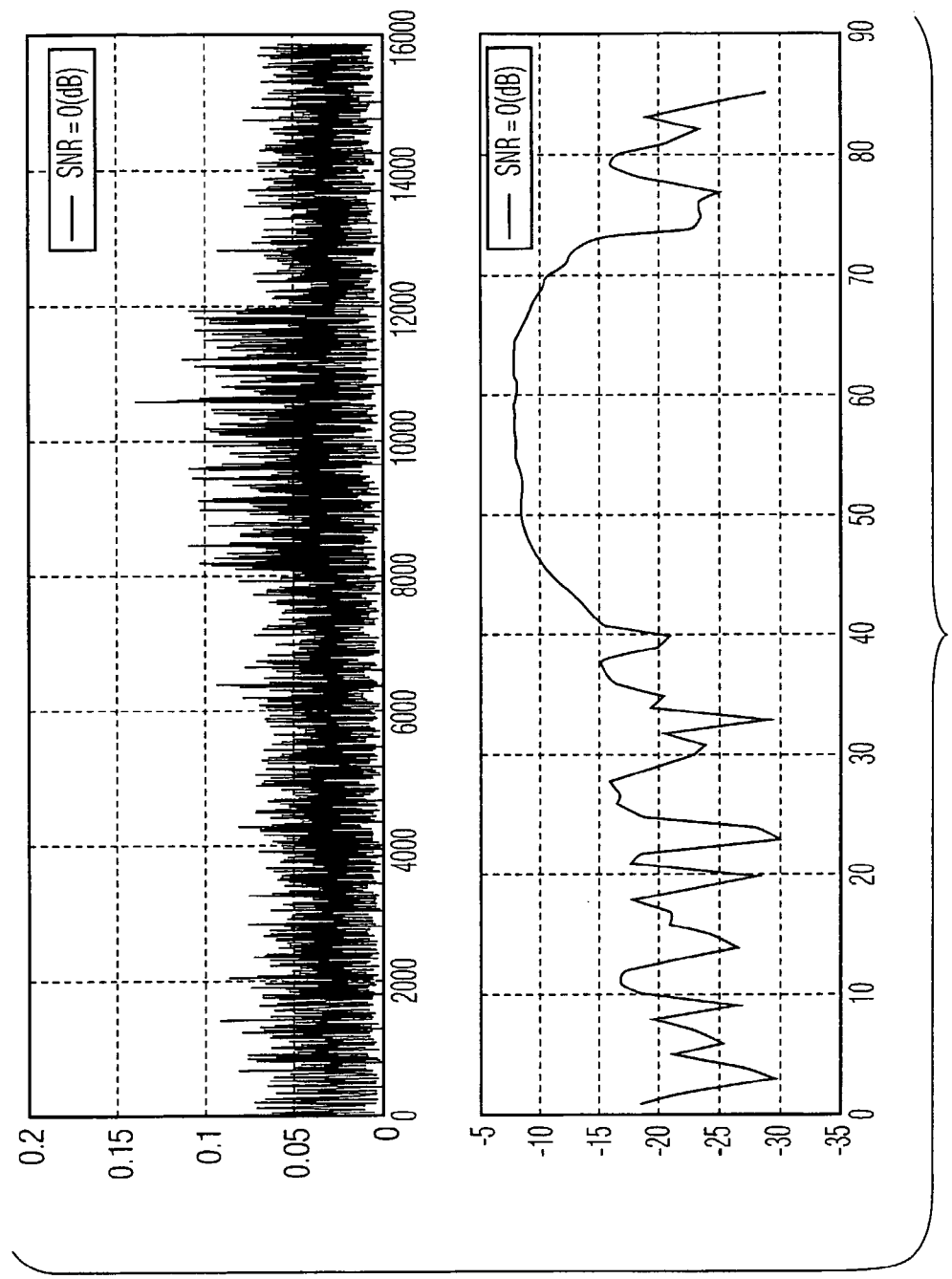
FIG. 7 is a signal diagram showing a received UWB signal and its cross-correlation with a locally-generated signal (e.g., a sinusoid) in a 0 dB SNR system.
Figure 8:
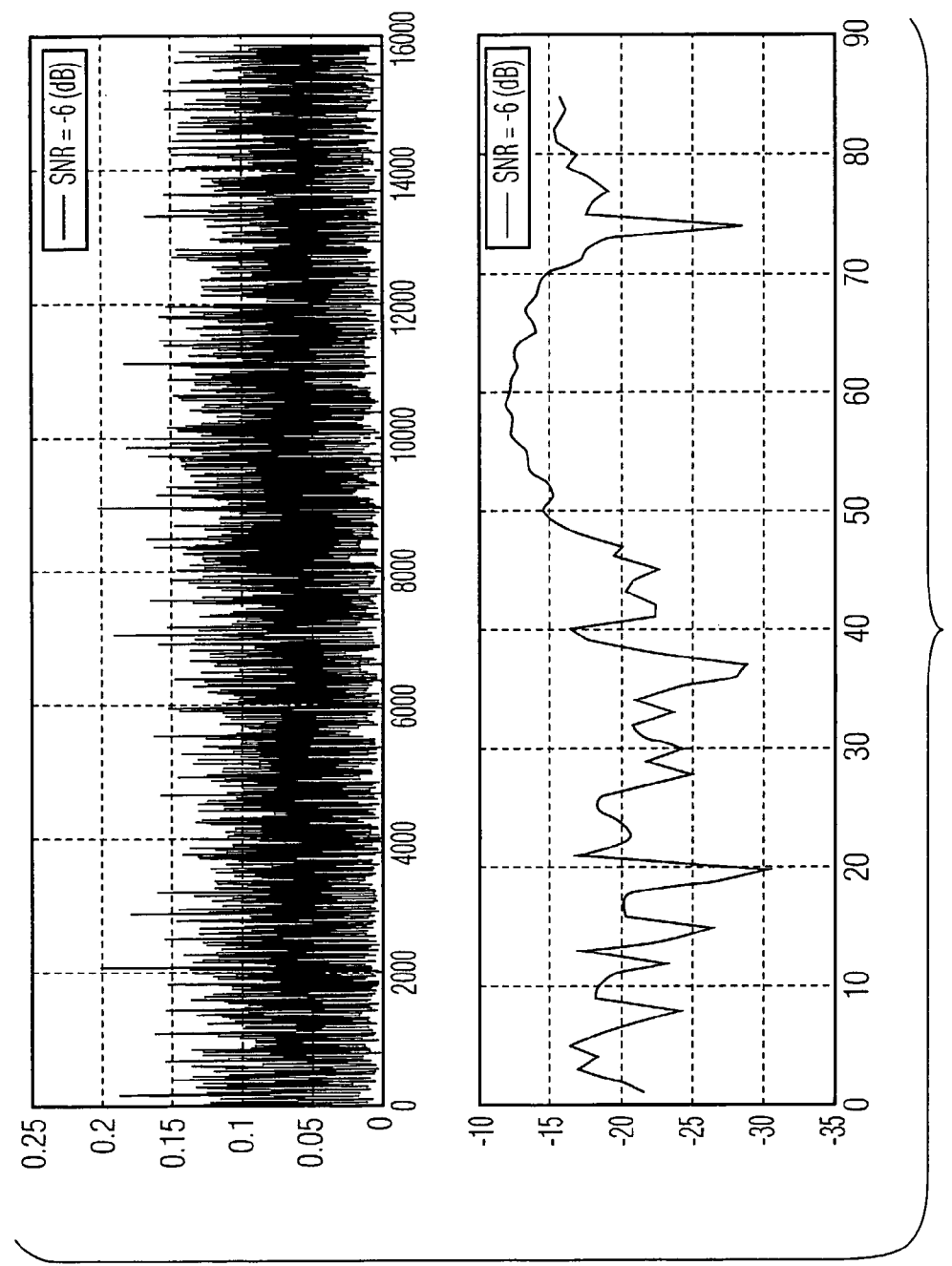
FIG. 8 is a signal diagram showing a received UWB signal and its cross-correlation with a locally-generated signal (e.g., a sinusoid) in a −6 dB SNR system.

In FIG. 6, noise precedes the UWB signal, lasts about 4000 samples and is followed by pure noise again. It is clear that when the UWB signal is received, the cross-correlation output is much higher than the cross-correlation output with noise only. FIG. 7 and FIG. 8 show the similar case as that in FIG. 6 except that the SNR is much lower, the arrival of the UWB signal is not as obvious, but the correlator output still shows a significant difference. All three figures are the results of a UWB signal in a fading channel with 200 kHz offset, a $3^{rd}$ order inverse Chebychev filter being used as channel filter.

Based upon the results the following symbol based detection scheme is proposed. By using a predetermined threshold, if the correlator output is greater than the threshold, a busy medium is declared. The detailed detection scheme is described as follows:

1. Capture 165 samples (one symbol data), calculate the cross correlation as equation (10) and store the results in the buffer.
2. Repeat step 1 by N times (N symbols) and average the N correlator results.
3. Compare the results in 2 with a predetermined threshold; if it is greater than the threshold, a CCA busy is reported.
4. If the result <threshold, then repeat step 1 and 2, but average over only the latest N correlator outputs. That is:

$$X\text{corr}(k) = \frac{1}{N}[N \cdot X\text{corr}(k-1) - \text{corr}(k-N) + \text{corr}(k)] \qquad (11)$$

Here, corr(n) is the cross correlation output of the $n^{th}$ symbol using equation (10). And Xcorr(k) is the $k^{th}$ output of N-symbol moving average of cross correlation. The above algorithm is very simple and the number of symbols (parameter N) used for the average determines the reliability. An enhanced algorithm can be used to improve the false alarm and missed frame performance. For example, a counter can be used to see if two or more consecutive outputs are greater than the threshold.

Figure 11:
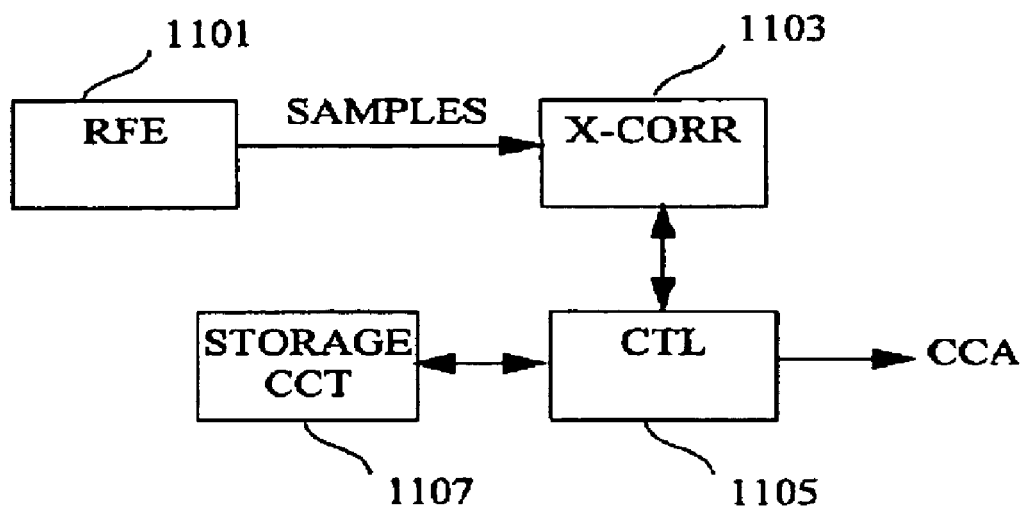
FIG. 11 is a block diagram illustrating a second Clear Channel Assessment circuit.

Referring to FIG. 11, a block diagram is shown of a circuit for performing Clear Channel Assessment according to the foregoing method. A Radio Front End (RFE) circuit 1101 produces signal samples that are applied to a cross-correlation circuit 1103 controlled by a control circuit 1105. The control circuit 1105 operates according to the foregoing algorithm, using a storage circuit 1107 to record the average value of the N preceding cross-correlation results. Based on the average value, the control circuit 1105 produces a Clear Channel Assessment signal CCA.

Two methods have been proposed to exploit the periodicity of the MB-OFDM signal envelope to perform clear channel assessment. Detailed simulations of the two methods have been undertaken. These results showed that the Moving Average and Cross-Correlation algorithms are both robust to multipath channel conditions and show high detection (>90%) performance for SNR≧−2 dB. False alarm rate and detection rate can be further optimized to have a good balance according to the application requirements. Both algorithms are robust to non-perfect hopping synchronization. MA has poorer capability of piconet identification and CC has less SOP (Simultaneously Operating Piconets) tolerance. The CC algorithm is preferred in a normal SOHO/CE environment where the SOP issue can be alleviated by proper protocol definition.

This invention has application in any radio communications system characterized by a known periodic signal envelope, where the periodic interval is much shorter than the required detection time.

The throughput efficiency of high rate data communications using MB-OFDM UWB will be greatly enhanced by providing such a CCA mechanism.

Other, non-UWB applications may be found in the future where OFDM is employed using a zero prefix. Examples include future cognitive radio systems and 4G cellular systems employing OFDM.

What is claimed is:

1. A method of clear channel assessment with respect to a communications medium expected to sometimes carry a specified communications signal, comprising:
    attempting reception of the specified communications signal to produce a received signal;
    deriving the envelope of the received signal from the received signal;
    cross-correlating the envelope of the received signal with a locally-generated signal to obtain a cross-correlation result;
    combining multiple cross-correlations results to obtain a combined cross-correlation result;
    comparing the combined cross-correlation result to a threshold; and
    based on said comparing, producing a clear channel assessment result,
    wherein cross-correlating the envelope of the received signal with the locally-generated signal to obtain the cross-correlation result comprises cross-correlating the envelope of the received signal with a rectangular wave or a sine wave, wherein the specified communications signal is a multi-band OFDM ultra-wideband signal, and wherein the rectangular wave or the sine wave has a frequency that is equal to a symbol rate of the multi-band OFDM ultra-wideband signal.

2. The method of claim 1, wherein combining the multiple cross-correlations results to obtain the combined cross-correlation result comprises averaging the multiple cross-correlations results to obtain the combined cross-correlation result.

3. A method of clear channel assessment with respect to a communications medium expected to sometimes carry a specified communications signal, comprising:
    attempting reception of the specified communications signal to produce a received signal;
    determining a moving average power of the received signal to produce a moving average output signal;
    performing peak detection with respect to the moving average output signal, including determining whether a suspected peak value is valid; and depending on a number of valid peaks detected, producing a clear channel assessment result, wherein the method comprises cross-correlating the envelope of the received signal with a rectangular wave or a sine wave, wherein the specified communications signal is a multi-band OFDM ultra-wideband signal, and wherein the rectangular wave or the sine wave has a frequency that is equal to a symbol rate of the multi-band OFDM ultra-wideband signal.

4. Apparatus for clear channel assessment with respect to a communications medium expected to sometimes carry a specified communications signal, comprising:

means for attempting reception of the specified communications signal to produce a received signal;

means for deriving the envelope of the received signal from the received signal;

means for cross-correlating the envelope of the received signal with a locally-generated signal to obtain a cross-correlation result;

means for combining multiple cross-correlations results to obtain a combined cross-correlation result;

means for comparing the combined cross-correlation result to a threshold; and means for, based on said comparing, producing a clear channel assessment result, wherein means for cross-correlating the envelope of the received signal with the locally-generated signal to obtain the cross-correlation result is configured to cross-correlate the envelope of the received signal with a rectangular wave or a sine wave, wherein the specified communications signal is a multi-band OFDM ultra-wideband signal, and wherein the rectangular wave or the sine wave has a frequency that is equal to a symbol rate of the multi-band OFDM ultra-wideband signal.

5. The apparatus of claim 4, wherein means for combining the multiple cross-correlations results to obtain the combined cross-correlation result is configured to average the multiple cross-correlations results to obtain the combined cross-correlation result.

6. Apparatus for clear channel assessment with respect to a communications medium expected to sometimes carry a specified communications signal, comprising:

means for attempting reception of the specified communications signal to produce a received signal;

means for determining a moving average power of the received signal to produce a moving average output signal;

means for performing peak detection with respect to the moving average output signal, including determining whether a suspected peak value is valid; and means for, depending on a number of valid peaks detected, producing a clear channel assessment result, wherein the apparatus further comprises means for cross-correlating the envelope of the received signal with a rectangular wave or a sine wave, wherein the specified communications signal is a multi-band OFDM ultra-wideband signal, and wherein the rectangular wave or the sine wave has a frequency that is equal to a symbol rate of the multi-band OFDM ultra-wideband signal.

* * * * *